United States Patent
Cho (10) Patent No.: US 12,441,348 B2
(45) Date of Patent: Oct. 14, 2025

(54) VEHICLE CONTROL METHOD AND SYSTEM BASED ON TRAFFIC SIGN INFORMATION

(71) Applicants: Hyundai Motor Company, Seoul (KR); Kia Corporation, Seoul (KR)

(72) Inventor: Jin Kyeom Cho, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 129 days.

(21) Appl. No.: 18/370,112

(22) Filed: Sep. 19, 2023

(65) Prior Publication Data
US 2024/0326852 A1 Oct. 3, 2024

(30) Foreign Application Priority Data

Apr. 3, 2023 (KR) .......................... 10-2023-0043643

(51) Int. Cl.
*B60W 50/14* (2020.01)
*B60W 30/14* (2006.01)
(Continued)

(52) U.S. Cl.
CPC .......... *B60W 50/14* (2013.01); *B60W 30/143* (2013.01); *B60W 30/18163* (2013.01);
(Continued)

(58) Field of Classification Search
CPC ............... B60W 50/14; B60W 30/143; B60W 30/18163; B60W 2050/143; B60W 2050/146; B60W 2555/60; G06V 20/582
See application file for complete search history.

(56) References Cited

U.S. PATENT DOCUMENTS

2012/0173069 A1* 7/2012 Tsimhoni ........... G01C 21/3664
701/25
2016/0035028 A1 2/2016 Hedges
(Continued)

FOREIGN PATENT DOCUMENTS

JP 2009-109404 * 5/2009
JP 4482794 6/2010
(Continued)

OTHER PUBLICATIONS

Takeda Seiichi, inventor; Traffic Sign Display Apparatus, 2009, JP2009-109404A English Translation, pp. 1-27 (Year: 2009).*
English Translation JP2009-109404A.*

*Primary Examiner* — Brian A Zimmerman
*Assistant Examiner* — Cal J Eustaquio
(74) *Attorney, Agent, or Firm* — MORGAN, LEWIS & BOCKIUS LLP (57) ABSTRACT

A method and system for controlling a vehicle based on traffic sign information includes determining an operating region and a current driving region of a vehicle, determining, based on a result of the determining of the operating region and the current driving region being different from each other and a traffic sign being recognized in front of the vehicle, whether a traffic sign corresponding to the recognized traffic sign is present among traffic signs applicable to the operating region, and visualizing, based on the traffic sign corresponding to the recognized traffic sign being present among the traffic signs applicable to the operating region, the recognized traffic sign into the corresponding traffic sign through conversion.

18 Claims, 6 Drawing Sheets

PRIORITY

YIELD AND WAIT

NO OVERTAKING

OPPOSITE SIDE PRIORITY

NO ENTRY

END OF RESTRICTION

HIGHWAY AHEAD

CAUTION FOR TRAFFIC CONGESTION AHEAD (51) Int. Cl.
  *B60W 30/18* (2012.01)
  *G06V 20/58* (2022.01)
(52) U.S. Cl.
  CPC ..... *G06V 20/582* (2022.01); *B60W 2050/143* (2013.01); *B60W 2050/146* (2013.01); *B60W 2555/60* (2020.02)

(56) References Cited

U.S. PATENT DOCUMENTS

2018/0260639 A1* 9/2018 Kapach ................ G06V 10/751
2022/0063653 A1* 3/2022 Beaurepaire ....... G01C 21/3453

FOREIGN PATENT DOCUMENTS

| JP | 2019-082382 | 5/2019 |
| KR | 10-2017-0054849 | 5/2017 |
| KR | 10-2020-0001338 | 1/2020 |
| KR | 10-2021-0086415 | 7/2021 |

* cited by examiner

FIG. 1

PRIORITY

YIELD AND WAIT

NO OVERTAKING

OPPOSITE SIDE PRIORITY

NO ENTRY

END OF RESTRICTION

HIGHWAY AHEAD

CAUTION FOR TRAFFIC CONGESTION AHEAD

| CONTROL MODE | TRAFFIC SIGN | KOREA | EUROPE (GERMANY) | US | NOTIFICATION |
|---|---|---|---|---|---|
| ATTENTION | DRIVING ATTENTION TRAFFIC SIGN | | | | |
| SPEED | MAXIMUM SPEED | 50 | 50 | | |
| | MINIMUM SPEED | 30 | 30 | | |
| INTERSECTION | PRIORITY ROAD | | ◆ | | |
| | YIELD | ▽ | ▽ | ▽ | |
| | UNPROTECTED LEFT TURN | | | | |
| LAND | NO OVERTAKING CARPOOL/BUS ONLY | | | | |
| STOP | STOP NO ENTRY NO THROUGH TRAFFIC | | | | |

VEHICLE CONTROL METHOD AND SYSTEM BASED ON TRAFFIC SIGN INFORMATION

CROSS REFERENCE TO RELATED APPLICATION

The present application claims priority to Korean Patent Application No. 10-2023-0043643, filed Apr. 3, 2023, the entire contents of which is incorporated herein for all purposes by this reference.

BACKGROUND OF THE PRESENT DISCLOSURE

Field of the Present Disclosure

The present invention relates to a vehicle control method and system, and more particularly, to a vehicle control method and system based on traffic sign information.

Description of Related Art

Figure 1:
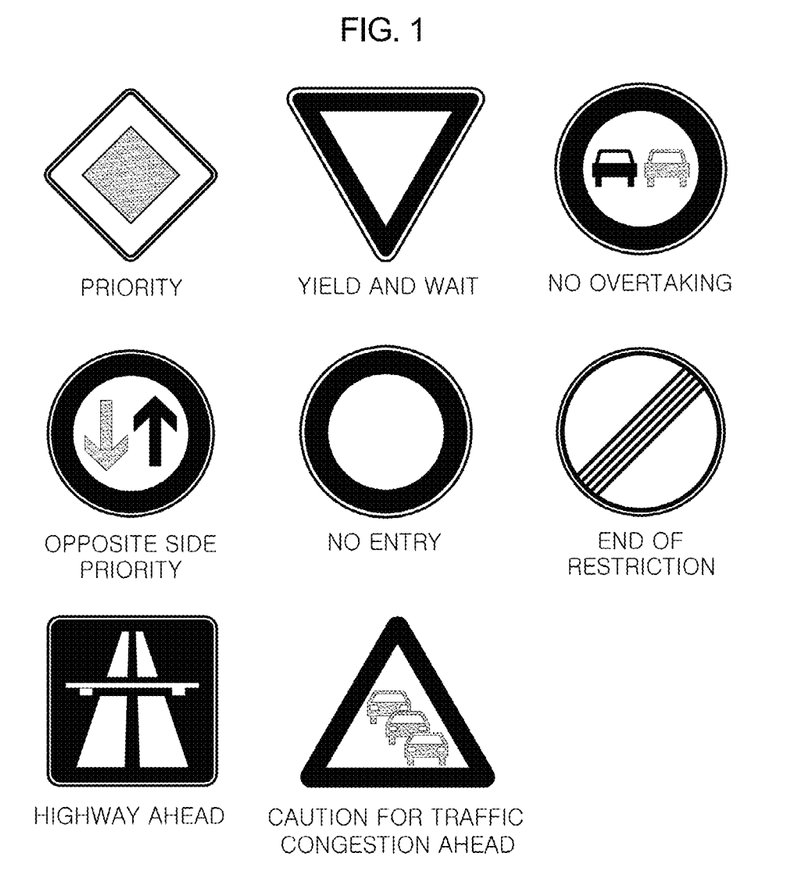
FIG. 1 illustrates various traffic signs within Korea as examples.

When driving a vehicle, it is essential to check traffic signs for regulations, cautions, directions, etc., to recognize road conditions. Traffic signs can vary by country, and in Korea, for example, there are various traffic signs such as priority road, yield and wait, no overtaking, opposite side priority, no entry, end of restriction, highway ahead, caution for traffic congestion ahead, and many others, as shown in FIG. 1.

These traffic signs are often applied in short sections of the road and the compliance requirements may vary depending on the direction of travel and the situation. Some navigation systems display traffic sign information to provide drivers with information on traffic signs, but there are limitations to displaying such information on the vehicle's navigation system. Therefore, drivers need to visually check traffic signs on the road to recognize their instructions. However, novice drivers or even experienced drivers on unfamiliar roads may have difficulty in checking traffic signs on the road and following their instructions while driving. Especially abroad, driving can present additional challenges as the shapes and compliance rules of traffic signs may differ, making it more difficult to follow their instructions and comply with instructions of the traffic signs while driving.

Meanwhile, recent advancements in technology have enabled the use of cameras installed in vehicles to recognize traffic signs, providing assistance to the driver driving on the road. One such technology is Intelligent Speed Limit Assist (ISLA), which automatically recognizes speed limit traffic signs with a camera installed in the front of the vehicle and limits the vehicle's speed to the speed limit or below. This technology differs from the conventional Manual Intelligent Speed Limit Assist (MSLA) technology with which the driver sets the speed limit manually in that the vehicle's speed limit is automatically set.

However, this Intelligent Speed Limit Assist (ISLA) technology has a limitation in that it can only assist in preventing the vehicle from traveling above the speed limit and cannot respond to various traffic signs.

Therefore, in this technology, there is a need for a system capable of recognizing various traffic signs and controlling the vehicle by reflecting the information obtained therefrom.

The information included in this Background of the present disclosure section is only for enhancement of understanding of the general background of the present disclosure and may not be taken as an acknowledgement or any form of suggestion that this information forms the related art already known to a person skilled in the art.

BRIEF SUMMARY

Various aspects of the present disclosure are directed to providing the driver with traffic sign information while driving on the road.

Another technical object of the present invention is to differentiate the acceleration, deceleration, stopping control, and powertrain mode of the vehicle depending on the type of traffic sign on the road where the vehicle is traveling and the driving status of the vehicle, and to control the vehicle accordingly so that the driver can comply with the traffic sign instructions.

Another technical object of the present invention is to allow drivers to safely drive their vehicles and avoid traffic fines when driving on roads in foreign countries for a short time period, by ensuring compliance with traffic sign instructions.

A vehicle control method for accomplishing the above objects according to various exemplary embodiments of the present disclosure includes determining an operating region and a current driving region of a vehicle; determining, based on a result of the determining of the operating region and the current driving region being different from each other and a traffic sign being recognized in front of the vehicle, whether a traffic sign corresponding to the recognized traffic sign is present among traffic signs applicable to a operating region; and visualizing, based on the traffic sign corresponding to the recognized traffic sign being present among the traffic signs applicable to the operating region, the recognized traffic sign into the corresponding traffic sign through conversion.

Here, the vehicle control method may further include notifying, based on a traffic sign corresponding to the recognized traffic sign being absent among the traffic signs applicable to the operating region, information on the recognized traffic sign in a language of the operating region.

Here, notifying the information on the recognized traffic sign may be performed via voice or visualized information.

Here, the corresponding traffic sign may be visualized via a cluster or a head-up display (HUD).

Here, the vehicle control method may further include performing, in response to the vehicle entering a traffic signal application area, variable control of the vehicle based on the information of the traffic sign and a driving status of the vehicle.

Here, the variable control of the vehicle may be one of lane change control, acceleration prevention control, acceleration control, deceleration prevention control, deceleration control, and stop control.

Here, the vehicle control method may further include terminating, in response to the vehicle leaving the traffic sign application area, the variable control of the vehicle.

Here, the vehicle control method may further include determining a variable control level for performing the variable control of the vehicle, wherein the variable control of the vehicle may be performed based on the variable control level.

Here, the vehicle control method may further include determining whether variable control of the vehicle is activated, wherein determining the operating region and the current driving region of the vehicle may be performed based on the variable control of the vehicle being activated.

Here, the driving status of the vehicle may be acquired from an external camera, a Light Detection and Ranging (LiDAR) sensor, a speed sensor, an Accelerator Pedal Position Sensor (APS), a Brake Pedal Sensor (BPS), or a steering angle sensor of the vehicle, or any combination thereof.

Meanwhile, a vehicle control system according to various exemplary embodiments of the present disclosure includes a processor configured to determine an operating region and a current driving region of a vehicle, determine, based on a result of the determining of the operating region and the current driving region being different from each other and a traffic sign being recognized in front of the vehicle, whether a traffic sign corresponding to the recognized traffic sign is present among traffic signs applicable to a operating region, and visualize, based on the traffic sign corresponding to the recognized traffic sign being present among the traffic signs applicable to the operating region, the recognized traffic sign into the corresponding traffic sign through conversion, and a transceiver configured to receive information on the operating region and the current operating region.

Here, the processor may be further configured to notify, based on a traffic sign corresponding to the recognized traffic sign being absent among the traffic signs applicable to the operating region, information on the recognized traffic sign in a language of the operating region.

Here, notifying the information on the recognized traffic sign may be performed via voice or visualized information.

Here, the corresponding traffic sign may be visualized via a cluster or head-up display (HUD).

Here, the processor may be further configured to perform, in response to the vehicle entering a traffic signal application area, variable control of the vehicle based on the information of the traffic sign and the driving status of the vehicle.

Here, the variable control of the vehicle may be one of lane change control, acceleration prevention control, acceleration control, deceleration prevention control, deceleration control, and stop control.

Here, the processor may be further configured to terminate in response to the vehicle leaving the traffic sign application area, the variable control of the vehicle.

Here, the processor may be further configured to determine a variable control level for performing the variable control of the vehicle, wherein the variable control of the vehicle may be performed based on the variable control level.

Here, the processor may be further configured to determine whether the variable control of the vehicle is activated and determine, based on the variable control of the vehicle being activated, the operating region and the current driving region of the vehicle.

Here, the driving status of the vehicle may be obtained from at least one of an external camera, a light detection and ranging (lidar) sensor, a speed sensor, an accelerator pedal position sensor (APS), a brake pedal sensor (BPS), or a steering angle sensor, or a combination thereof.

According to an exemplary embodiment of the present disclosure, it is to provide the driver with traffic sign information while driving on the road.

In addition, according to an exemplary embodiment of the present disclosure, it is possible to differentiate the acceleration, deceleration, stopping control, and powertrain mode of the vehicle depending on the type of traffic sign on the road where the vehicle is traveling and the driving status of the vehicle, and to control the vehicle accordingly so that the driver can comply with the traffic sign instructions.

In addition, according to an exemplary embodiment of the present disclosure, it is possible to allow drivers to safely drive their vehicles and avoid traffic fines when driving on roads in foreign countries for a short time period, by ensuring compliance with traffic sign instructions.

The advantages of the present invention are not limited to the aforesaid, and other advantages not described herein may be clearly understood by those skilled in the art from the descriptions below.

The methods and apparatuses of the present invention have other features and advantages which will be apparent from or are set forth in more detail in the accompanying drawings, which are incorporated herein, and the following Detailed Description, which together are configured to explain certain principles of the present invention.

It may be understood that the appended drawings are not necessarily to scale, presenting a somewhat simplified representation of various features illustrative of the basic principles of the present disclosure. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

Hereinafter, descriptions are including the embodiments included in the present specification with reference to the accompanying drawings in which the same reference numbers are assigned to refer to the same or like components and redundant description thereof is omitted. As used in the following description, the suffix "module" and "unit" are granted or used interchangeably in consideration of easiness of description but, by itself, having no distinct meaning or role. In addition, detailed descriptions of well-known technologies related to the embodiments included in the present specification may be omitted to avoid obscuring the subject matter of the embodiments included in the present specification. In addition, the accompanying drawings are only for easy understanding of the embodiments included in the present specification and do not limit the technical spirit included herein, and it should be understood that the embodiments include all changes, equivalents, and substitutes within the spirit and scope of the present disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in the present specification, specify the presence of a stated feature, number, step, operation, component, element, or a combination thereof, but they do not preclude the presence or addition of one or more other features, numbers, steps, operations, components, elements, or combinations thereof.

Figure 2:
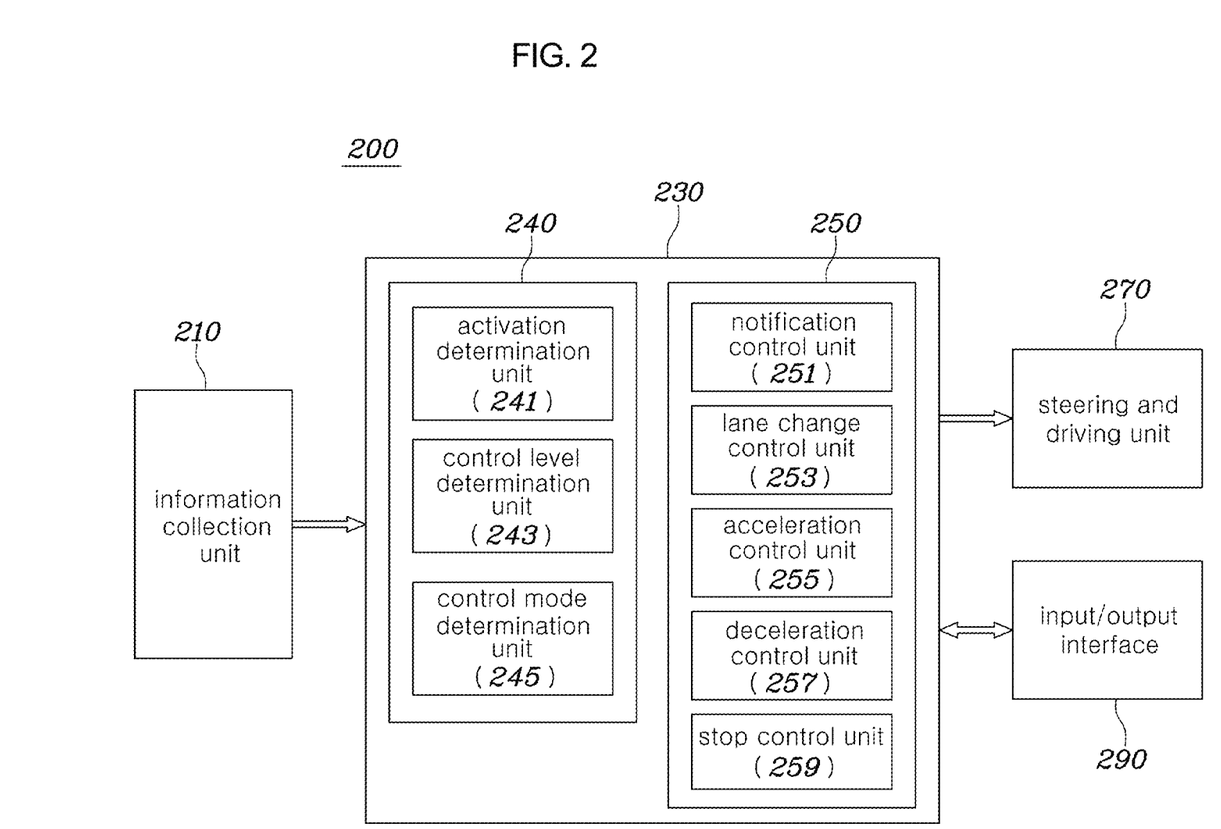
FIG. 2 is a block diagram schematically illustrating a configuration of a vehicle control system according to various exemplary embodiments of the present disclosure.

FIG. 2 is a block diagram schematically illustrating a configuration of a vehicle control system according to various exemplary embodiments of the present disclosure.

With reference to FIG. 2, the vehicle control system 200 according to the present exemplary embodiment includes an information collection unit 210, a processor 230, a steering and driving unit 270, and an input/output interface 290.

The information collection unit 210 collects information for controlling the vehicle.

Here, the information for controlling the vehicle may include traffic sign control User Select Manual (USM) information, traffic sign information, the distance between the vehicle and the traffic signs, the speed of the vehicle, information on the acceleration pedal, information on the brake pedal, information on the turn signal, information on the steering angle of the handle, or information on the speed of the vehicle driving in the opposite direction, on any combination thereof.

Here, the traffic sign control USM information may include information inputted by the driver, as well as information on whether to activate the variable control of the vehicle based on the traffic signs, information on the variable control level, and information on the driver's place of residence.

Here, the information collection unit 210 may include an external camera, a Light Detection and Ranging (LiDAR) sensor, a speed sensor, an Accelerator Pedal Position Sensor (APS), a Brake Pedal Sensor (BPS), or a steering angle sensor of the vehicle, or any combination thereof.

The processor 230 performs all operations necessary for variable control of the vehicle based on traffic sign information.

Here, the processor 230 may be the vehicle's Electrical Controller Unit (ECU) or one of the components constituting the ECU.

The processor 230 includes a determination unit 240 and a control unit 250.

The determination unit 240 includes an activation determination unit 241, a control level determination unit 243, and a control mode determination unit 245.

The activation determination unit 241 determines whether to activate the variable control of the vehicle based on the traffic sign information.

Here, the activation determination unit 241 may activate the traffic sign information-based variable vehicle control when the traffic sign control USM information includes information on activating the traffic sign information-based variable vehicle control and when the vehicle enters the area indicated by the traffic sign information recognized from the traffic sign in front of the vehicle.

Meanwhile, the activation determination unit 241 may deactivate the traffic sign information-based variable vehicle control when the traffic sign control USM information includes information on deactivating the traffic sign information-based variable vehicle control or when the vehicle has left the area indicated by the most recently recognized traffic sign information.

The control level determination unit 243 determines the variable control level of the vehicle when the traffic sign information-based variable vehicle control is activated.

The variable control level may be one of a plurality of variable control levels, e.g., one of three variable control levels.

Here, the three variable control levels may be high, medium, and low.

Here, the variable control levels may be included in the traffic sign control USM information.

The control mode determination unit 245 determines the control mode for performing vehicle control based on the traffic sign information in front of the vehicle.

Figure 3:
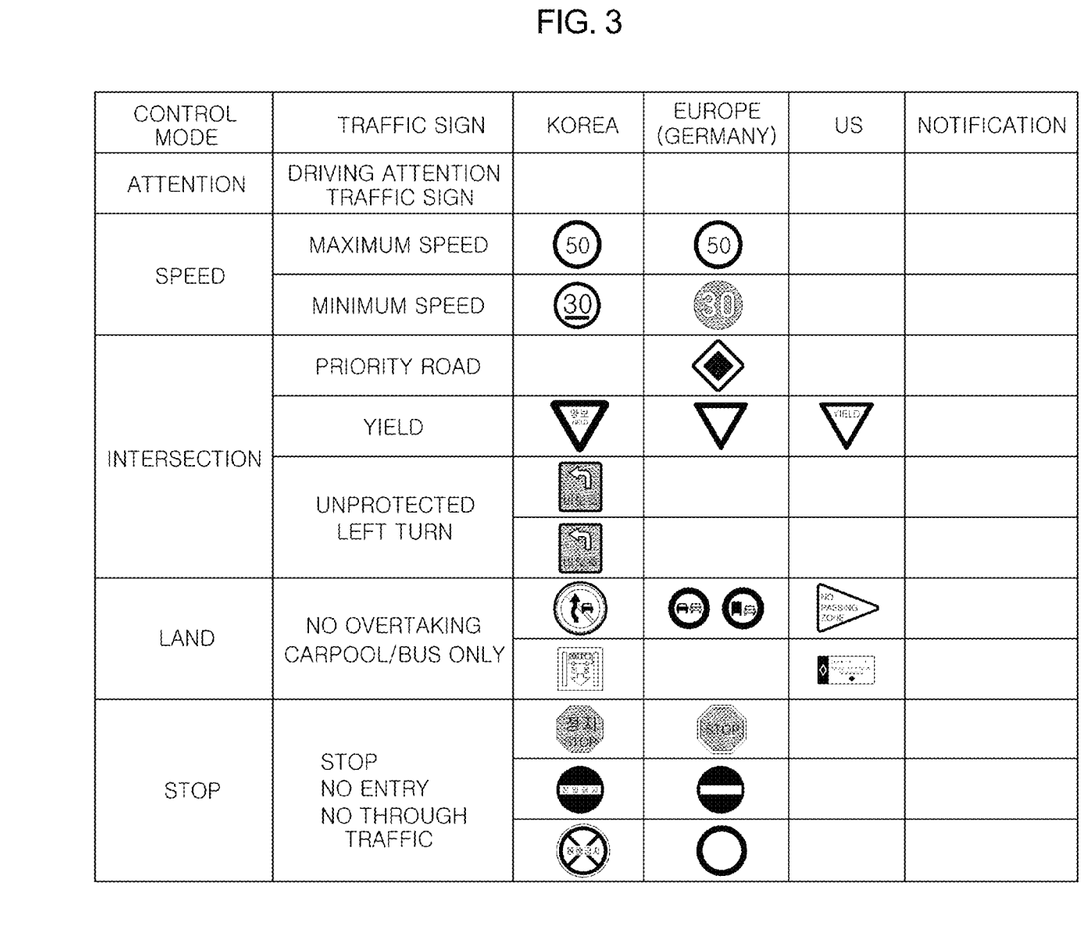
FIG. 3 illustrates various types of traffic signs used in each country, as examples for use in an exemplary embodiment of the present disclosure.

FIG. 3 shows an example of the control modes that may be determined by the control mode determination unit 145. With reference to FIG. 3, the control mode may be one of the attention control mode, speed control mode, intersection control mode, lane control mode, and stop control mode.

The attention control mode may be determined when a traffic sign indicative of driving attention is recognized.

The speed control mode may be determined when a traffic sign indicative of maximum or minimum speed is recognized.

The intersection control mode may be determined when a traffic sign indicative of a priority road, yielding, or unprotected left turn is recognized.

The lane control mode may be determined when a traffic sign indicative of no overtaking, carpool lane only, or bus lane only is recognized.

The stop control mode may be determined when a traffic sign indicative of stop, no entry, or no through traffic is recognized.

The control unit 250 includes a notification control unit 251, a lane change control unit 253, an acceleration control unit 255, a deceleration control unit 257, and a stop control unit 259.

The notification control unit 251 sends information on a traffic sign recognized in front of the vehicle to the input/output interface 290 to notify the driver when a traffic sign is recognized by the vehicle.

Here, notification of the recognition of a traffic sign in front of the vehicle may be transmitted to the driver via voice, cluster, and head-up display (HUD).

Here, the notification control unit 251 determines whether there is a traffic sign corresponding to the traffic sign recognized by the vehicle among the traffic signs applicable to a operating region, and when there is a traffic sign corresponding to the traffic sign recognized in front of the vehicle among the traffic signs applicable to the operating region, it visualizes the recognized traffic sign into the corresponding traffic sign, i.e., the traffic sign peculiar to the operating region, through conversion.

Here, the operating region may be the driver's residential area.

Here, the information that has been converted to the traffic sign of the operating region may be visualized through a cluster, a head-up display (HUD), etc.

For example, when the traffic sign recognized by the vehicle in front is in a form of a sign with a blue background and white '30' written on it and the operating region is Korea, the notification control unit 251 may convert the recognized traffic sign to a traffic sign in a form of a red circle with a black-underlined '30' written inside it.

Here, information on the operating region may be included in the traffic sign control USM information.

Meanwhile, when there is no traffic sign corresponding to the traffic sign recognized in front of the vehicle within the driver's residential area among the traffic signs applicable to the operating region the vehicle, the information on the traffic sign is notified in the language of the driver's residential area.

Here, information on the traffic sign may be notified in the language of the operating region through voice or visualized information.

The lane change control unit 253, the acceleration control unit 255, the deceleration control unit 257, and the stop control unit 259 control the steering and driving unit 270 based on the traffic signs recognized by the vehicle in front and the driving status of the vehicle.

Here, the driving status of the vehicle may be acquired from an external camera, a Light Detection and Ranging (LiDAR) sensor, a speed sensor, an Accelerator Pedal Position Sensor (APS), a Brake Pedal Sensor (BPS), or a steering angle sensor of the vehicle, or any combination thereof.

The lane change control unit 253 may control the steering and driving unit 270 to keep the vehicle in the current lane without changing the lane, or to allow the vehicle to change lanes.

The acceleration control unit 255 may control the steering and driving unit 270 to control the acceleration of the vehicle.

The deceleration control unit 257 may control the steering and driving unit 270 to control the deceleration of the vehicle.

The stop control unit 259 may control the steering and driving unit 270 to bring the vehicle to a stop.

Table 1 shows an example of a variable control method and control levels of the vehicle based on the control mode, recognized traffic sign type, and driving status.

TABLE 1

| Control mode | Traffic sign | Driving status | Variable control method | Control level |
| --- | --- | --- | --- | --- |
| Attention | Driving attention sign | In motion | Acceleration prevention control | Driver setting level |
| | | | Deceleration increase control | Apply (High, |
| Speed | Maximum speed | Exceeding maximum speed | Acceleration prevention control | Intermediate, Low) |
| | Minimum speed | Below minimum speed | Deceleration prevention control | |
| Intersection | Priority | In motion | Acceleration increase control | |
| | Yield | In motion | Acceleration prevention control | |
| | Unprotected left turn | Opposite oncoming traffic absent | Acceleration increase control | |
| | | Opposite oncoming traffic present | Acceleration prevention control | |
| Lane | No overtaking Carpool only | Lane change attempt | Acceleration prevention control | |
| | Bus only | Lane entry | Lange change control | |
| Stop | Stop No entry | Acceleration | Acceleration prevention control | |
| | No through traffic | Deceleration | Deceleration increase control | |
| | | Halt | Stop control | |

In the variable control method of Table 1, lane change control is performed by the lane change control unit 253, and acceleration control and acceleration increase control may be performed by the acceleration control unit 255. In addition, deceleration prevention control and deceleration increase control may be performed by the deceleration control unit 257, and stop control may be performed by the stop control unit 259.

Figure 4A:
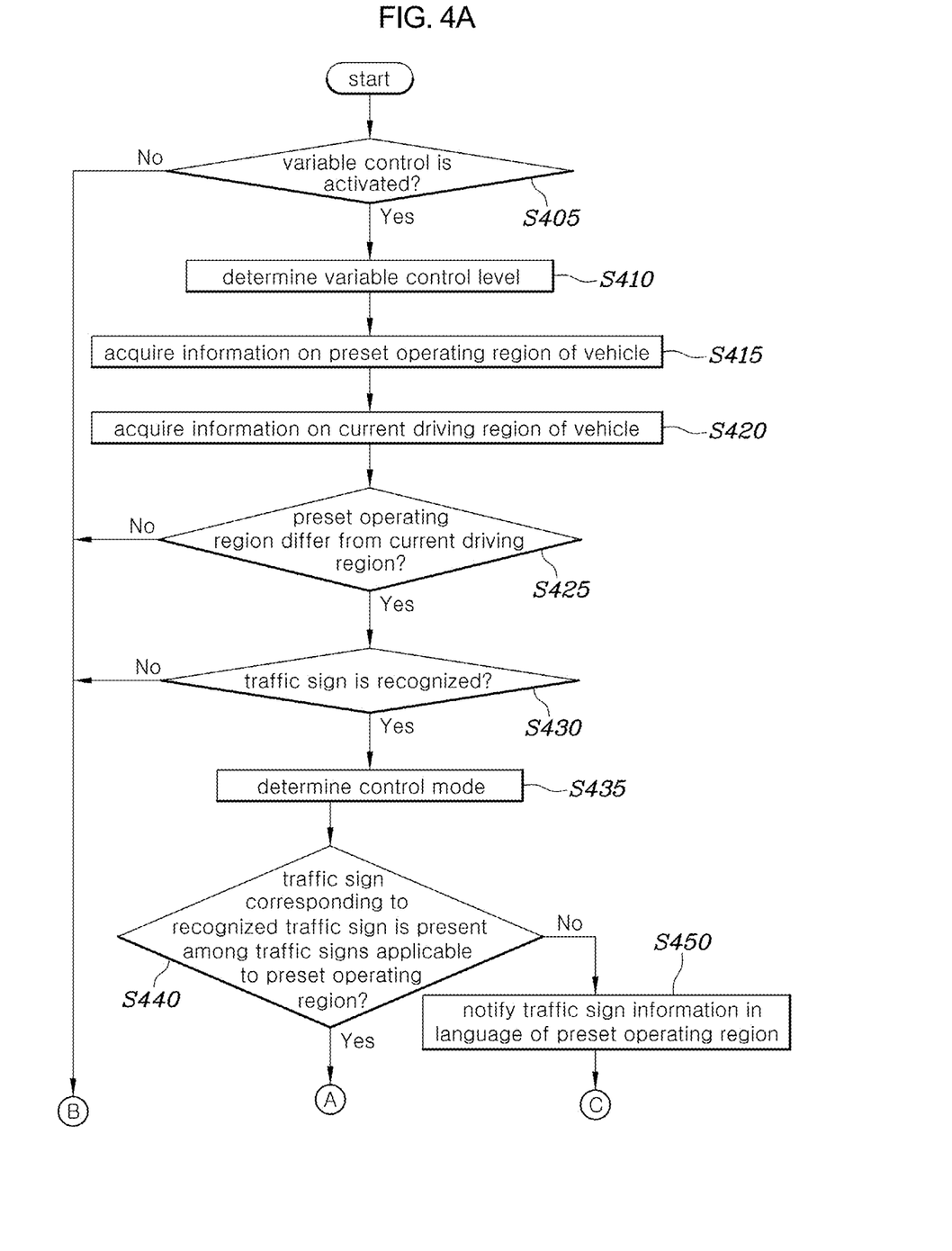
FIG. 4A and FIG. 4B are a flowchart illustrating a vehicle control method according to various exemplary embodiments of the present disclosure.
Figure 4B:
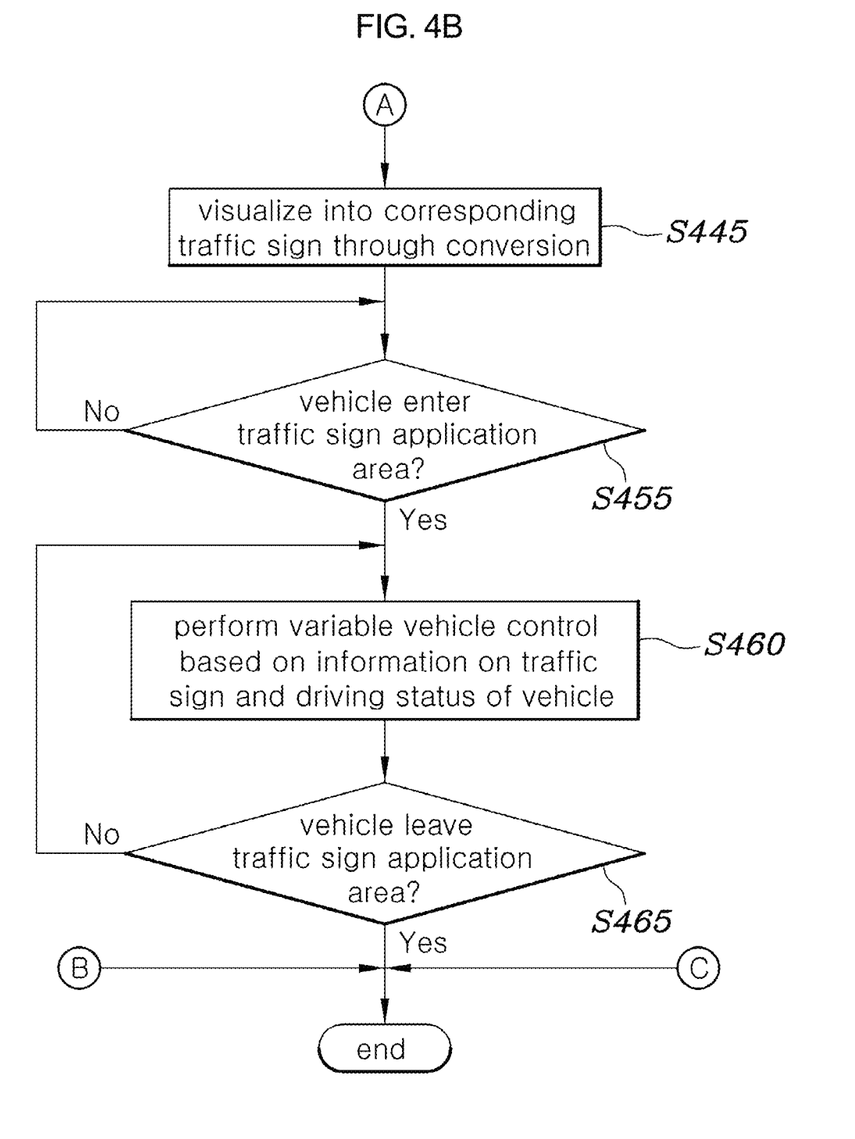

FIG. 4A and FIG. 4B are a flowchart illustrating a vehicle control method of a vehicle control system according to various exemplary embodiments of the present disclosure.

With reference to FIG. 4A, the vehicle control system 200 determines at step S405 whether to activate the traffic sign information-based variable vehicle control.

Here, the determination on whether to activate the variable vehicle control may be made by the activation determination unit 241.

In addition, the determination on whether to activate the variable vehicle control may be based on the information on whether to activate the variable vehicle control that is included in the traffic sign control USM information, which may be input by the driver via the input/output interface 290. The input/output interface 290 may be a display screen capable of touch input by a finger.

Here, the activation determination unit 241 may activate the traffic sign information-based variable vehicle control when the traffic sign control USM information includes information on activating the traffic sign information-based variable vehicle control and when the vehicle enters the area indicated by the traffic sign information recognized from the traffic sign in front of the vehicle.

When it is determined at step 405 to activate the variable vehicle control, the vehicle control system 200 determines the variable control level of the vehicle at step S410.

Here, the determination of the variable vehicle control level for the vehicle may be made by the control level determination unit 243.

The variable control level may be one of a plurality of variable control levels, e.g., one of three variable control levels.

Here, the three variable control levels may include high, medium, and low levels.

Here, the variable control levels may be included in the traffic sign control USM information.

Meanwhile, when it is determined at step 405 to deactivate the vehicle control mode, the procedure ends.

Next, the vehicle control system 200 acquires, at step 415, information on the operating region of the vehicle.

Here, the information on the operating region of the vehicle may be included in the traffic sign control USM information, which may be input by the driver via the input/output interface 290.

Next, the vehicle control system 200 acquires, at step 420, information on the current driving region of the vehicle.

Here, the information on the current driving region of the vehicle may be included in the traffic sign control USM information, which may be input by the driver via the input/output interface 290.

In addition, the information on the current driving region for the vehicle may be obtained from the Global Positioning System (GPS) sensor of the vehicle.

Next, the vehicle control system 200 determines at step S425 whether the vehicle's current driving region acquired at step S420 differs from the vehicle's operating region acquired at step S415.

When it is determined at step S425 that the operating region of the vehicle and the current driving region of the vehicle differ from each other, the vehicle control system 200 determines at step S430 whether a traffic sign is recognized and, when a traffic sign is recognized, the vehicle control system determines at step S435 a control mode to control vehicle therein based on the recognized traffic sign information.

When it is determined at step S425 that the operating region of the vehicle and the current driving region of the vehicle do not differ from each other, the vehicle control system 200 terminates the operation.

Next, the vehicle control system 200 determines, at step S435, a control mode to control the vehicle based on the traffic sign information in front of the vehicle.

Here, the determination of the control mode may be made by the control mode determination unit 245.

FIG. 3 shows an example of a control mode that may be determined at step S435. With reference to FIG. 3, the control mode may be one of the attention control mode, speed control mode, intersection control mode, lane control mode, and stop control mode.

The attention control mode may be determined when a traffic sign indicative of driving attention is recognized.

The speed control mode may be determined when a traffic sign indicative of maximum or minimum speed is recognized.

The intersection control mode may be determined when a traffic sign indicative of priority, yielding, or unprotected left turn is recognized.

The lane control mode may be determined when a traffic sign indicative of no overtaking, carpool lane only, or bus lane only is recognized.

The stop control mode may be determined when a traffic sign indicative of stop, no entry, or no through traffic is recognized.

Next, the vehicle control system 200 determines at step S440 whether there is a traffic sign corresponding to the recognized traffic sign among the traffic signs applicable to the operating region.

With reference to FIG. 4B together with FIG. 4A, when there is a traffic sign corresponding to the recognized traffic sign among the traffic signs applicable to the operating region, the vehicle control system 200 visualize the recognized traffic signal into the corresponding traffic sign through conversion at step S445.

Here, the information converted to the traffic sign peculiar to the driver's residential area may be visualized through a cluster, a head-up display (HUD), etc.

Meanwhile, when it is determined at step S440 that there is no corresponding traffic sign among the traffic signs applicable to the operating region, the traffic sign information is notified in the language of the operating region at step S450.

Here, information on the traffic sign may be notified in the language of operating region through voice or visualized information.

Next, the vehicle control system 200 determines at step S455 whether the vehicle has entered the traffic sign application area indicated by the traffic sign recognized in front thereof and, when the vehicle has entered the traffic sign application area, performs variable vehicle control at step S460 based on the control mode, the recognized traffic sign, and the driving status.

Here, the driving status of the vehicle may be acquired from an external camera, a Light Detection and Ranging (LiDAR) sensor, a speed sensor, an Accelerator Pedal Position Sensor (APS), a Brake Pedal Sensor (BPS), or a steering angle sensor of the vehicle, or any combination thereof.

Here, the variable vehicle control may be performed based on the control mode, recognized traffic sign, driving status, and variable control level according to Table 1.

In the variable control method of Table 1, the lane change control is performed by the lane change control unit 253, and the acceleration control and acceleration increase control may be performed by the acceleration control unit 255. In addition, deceleration prevention control and deceleration increase control may be performed by the deceleration control unit 257, and stop control may be performed by the stop control unit 259.

Next, the vehicle control system 200 determines at step S465 whether the vehicle has left the traffic sign application area and, when the vehicle has left the traffic sign application area, terminates the variable vehicle control.

Meanwhile, when it is determined at step S465 that the vehicle has not left the traffic sign application area, the vehicle control system 200 continues performing the variable vehicle control of step S460.

Figure 5:
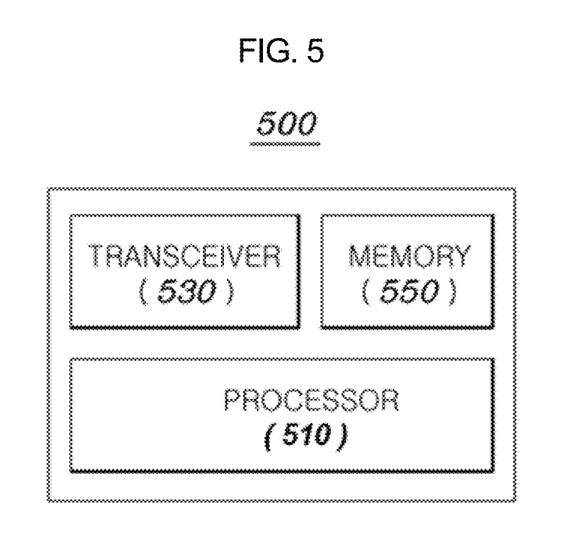
FIG. 5 illustrates a computer system according to various exemplary embodiments of the present disclosure.

FIG. 5 illustrates a computer system according to various exemplary embodiments of the present disclosure.

With reference to FIG. 5, an exemplary embodiment of the present invention may be implemented in a computer system such as a computer-readable storage medium. As shown in FIG. 5, the computer system 500 includes a processor 510, a transceiver 530, and a memory 550, and the transceiver 530 communicates with in-vehicle sensors including a GPS sensor or with the input/output interfaces of the vehicle.

The processor 510 implements the vehicle control method via the traffic sign information-based vehicle control system provided in the present specification. In detail, the processor 510 implements all operations of the vehicle control system described in the exemplary embodiments included in the present specification and performs all operations of the vehicle control method according to FIG. 4.

For example, the processor 510 determines whether to activate the traffic sign information-based vehicle control mode.

Here, the determination on whether to activate the vehicle control mode may be made based on the information on whether to activate the control mode that is disposed in the traffic sign control USM information, which may be information input by the driver via the input/output interface through the transceiver 530.

Here, the processor 510 may activate the traffic sign information-based variable vehicle control mode when the traffic sign control USM information includes information on activating the traffic sign information-based variable vehicle control and the vehicle enters the traffic sign application area, which is recognized through the traffic sign information in front of the vehicle.

When determining to activate the vehicle control mode, the activation determination unit 510 determines the variable control level of the vehicle.

Here, the variable control level may be one of a plurality of variable control levels, e.g., one of three variable control levels.

Here, the three variable control levels may be high, medium, and low.

Here, the variable control levels may be included in the traffic sign control USM information.

Meanwhile, when it is determined at step 405 to deactivate the vehicle control mode, the procedure ends.

Also, the processor 510 acquires the driver's residential area information.

Here, the driver's residential area information may be included in the traffic sign control USM information, and the traffic sign control USM information may be information input by the driver via the input/output interface through the transceiver 530.

Also, the processor 510 acquires information on the current driving region of the vehicle.

Here, the information on the current driving region of the vehicle may be included in the traffic sign control USM information, and the traffic sign control USM information may be information input by the driver via the input/output interface through the transceiver 530.

In addition, the information on the current driving region for the vehicle may be obtained from the Global Positioning System (GPS) sensor of the vehicle.

Also, the processor 510 determines whether a traffic sign is recognized and, when a traffic sign is recognized, determines the control mode to control vehicle therein based on the recognized traffic sign information.

The processor 510 determines the control mode to control the vehicle based on the traffic sign information in front of the vehicle.

FIG. 3 shows control modes that may be determined by the processor 510 as an example. With reference to FIG. 3, the control mode may be one of the attention control mode, speed control mode, intersection control mode, lane control mode, and stop control mode.

The attention control mode may be determined when a traffic sign indicative of driving attention is recognized.

The speed control mode may be determined when a traffic sign indicative of maximum or minimum speed is recognized.

The intersection control mode may be determined when a traffic sign indicative of priority, yielding, or unprotected left turn is recognized.

The lane control mode may be determined when a traffic sign indicative of no overtaking, carpool lane only, or bus lane only is recognized.

The stop control mode may be determined when a traffic sign indicative of stop, no entry, or no through traffic is recognized.

In addition, the processor 510 determines whether the traffic sign corresponding to the recognized traffic sign exists within the driver's residential area, and when the corresponding traffic sign exists, visualizes the recognized traffic signal into the corresponding traffic sign peculiar to the driver's residential area through conversion.

Here, the information converted to the traffic sign peculiar to the driver's residential area may be visualized through a cluster, a head-up display (HUD), etc.

Here, when the traffic sign corresponding to the recognized traffic sign does not exist within the driver's residential area, the processor 510 informs the driver of the information of the traffic sign in the driver's residential area language.

Here, the information on the traffic sign may be notified to the driver in the language of the driver's residential area through voice or visualized information.

Next, the processor 510 determines whether the vehicle has entered the traffic sign application area indicated by the traffic sign recognized in front thereof, and when the vehicle has entered the traffic sign application area, performs variable vehicle control based on the control mode, the recognized traffic sign, and the driving status.

Here, the driving status of the vehicle may be acquired from an external camera, a lidar sensor, a speed sensor, an Accelerator Pedal Position Sensor (APS), a Brake Pedal Sensor (BPS), or a steering angle sensor of the vehicle, or any combination thereof.

Here, the variable vehicle control may be performed based on the control mode, recognized traffic sign, driving status, and variable control level according to Table 1.

Next, the processor 510 determines whether the vehicle has left the traffic sign application area, and when the vehicle has left the traffic sign application area, it terminates the variable vehicle control.

Meanwhile, when the vehicle has not left the traffic sign application area, the processor 510 continues to perform vehicle variable control based on the recognized traffic sign and driving status.

The transceiver 530 is connected to the processor 510 and directly acquires information or transmits and/or receives driver information or vehicle driving status information. For example, the transceiver 530 receives traffic sign information or traffic sign control USM information.

The memory 550 may be various types of volatile or non-volatile storage media. Here, the memory 550 may store traffic sign control USM information, control level information, driver residential area information, vehicle driving region, control mode information, or recognized traffic sign information, or any combination thereof.

In an exemplary embodiment of the present invention, the memory 550 and the processor 510 may be provided as one chip, or provided as separate chips.

According to the embodiments of the present invention described so far, the vehicle may notify the driver of the traffic sign information of the road on which the vehicle is traveling.

In addition, it is possible to differentiate the acceleration, deceleration, stopping control, and powertrain mode of the vehicle depending on the type of traffic sign on the road where the vehicle is traveling and the driving status of the vehicle, and to control the vehicle accordingly so that the driver can comply with the traffic sign instructions.

In addition, according to an exemplary embodiment of the present disclosure, it is possible to allow drivers to safely drive their vehicles and avoid traffic fines when driving on roads in foreign countries for a short time period, by ensuring compliance with traffic sign instructions.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the memory and the processor may be provided as one chip, or provided as separate chips.

In an exemplary embodiment of the present invention, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

In an exemplary embodiment of the present invention, the control device may be implemented in a form of hardware or software, or may be implemented in a combination of hardware and software.

In addition, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless particularly stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. A vehicle control method including:
    determining an operating region and a current driving region of a vehicle;
    determining, based on a result of the determining of the operating region and the current driving region being different from each other and a traffic sign being recognized in front of the vehicle, whether a traffic sign corresponding to the recognized traffic sign is present among traffic signs applicable to a preset operating region;
    visualizing, based on the traffic sign corresponding to the recognized traffic sign being present among the traffic signs applicable to the preset operating region, the recognized traffic sign into the corresponding traffic sign through conversion; and
    notifying, based on a traffic sign corresponding to the recognized traffic sign being absent among the traffic signs applicable to the preset operating region, information on the recognized traffic sign in a language of the preset operating region.

2. The vehicle control method of claim 1, wherein the notifying of the information on the recognized traffic sign is performed via voice or visualized information.

3. The vehicle control method of claim 1, wherein the corresponding traffic sign is visualized via a cluster or a head-up display (HUD).

4. The vehicle control method of claim 1, further including:

performing, in response to the vehicle entering a traffic signal application area, variable control of the vehicle based on information of the traffic sign and a driving status of the vehicle.

5. The vehicle control method of claim 4, wherein the variable control of the vehicle is one of lane change control, acceleration prevention control, acceleration control, deceleration prevention control, deceleration control, and stop control.

6. The vehicle control method of claim 4, further including:
terminating, in response to the vehicle leaving the traffic sign application area, the variable control of the vehicle.

7. The vehicle control method of claim 4, further including:
determining a variable control level for performing the variable control of the vehicle, wherein the variable control of the vehicle is performed based on the variable control level.

8. The vehicle control method of claim 1, further including:
determining whether variable control of the vehicle is activated, wherein the determining of the operating region and the current driving region of the vehicle is performed based on the variable control of the vehicle being activated.

9. The vehicle control method of claim 4, wherein the driving status of the vehicle is obtained from at least one of an external camera, a light detection and ranging (lidar) sensor, a speed sensor, an accelerator pedal position sensor (APS), a brake pedal sensor (BPS), or a steering angle sensor, or a combination thereof.

10. A vehicle control system comprising:
a processor configured to determine an operating region and a current driving region of a vehicle, determine, based on a result of the determining of the operating region and the current driving region being different from each other and a traffic sign being recognized in front of the vehicle, whether a traffic sign corresponding to the recognized traffic sign is present among traffic signs applicable to a preset operating region, and visualize, based on the traffic sign corresponding to the recognized traffic sign being present among the traffic signs applicable to the preset operating region, the recognized traffic sign into the corresponding traffic sign through conversion; and
a transceiver configured to receive information on the preset operating region and the current driving region,
wherein the processor is further configured to notify, based on a traffic sign corresponding to the recognized traffic sign being absent among the traffic signs applicable to the preset operating region, information on the recognized traffic sign in a language of the preset operating region.

11. The vehicle control system of claim 10, wherein the information on the recognized traffic sign is notified via voice or visualized information.

12. The vehicle control system of claim 10, wherein the corresponding traffic sign is visualized via a cluster or a head-up display (HUD).

13. The vehicle control system of claim 10, wherein the processor is further configured to perform, in response to the vehicle entering a traffic signal application area, variable control of the vehicle based on the information of the traffic sign and the driving status of the vehicle.

14. The vehicle control system of claim 13, wherein the variable control of the vehicle is one of lane change control, acceleration prevention control, acceleration control, deceleration prevention control, deceleration control, and stop control.

15. The vehicle control system of claim 13, wherein the processor is further configured for terminating, in response to the vehicle leaving the traffic sign application area, the variable control of the vehicle.

16. The vehicle control system of claim 13, wherein the processor is further configured to determine a variable control level for performing the variable control of the vehicle, wherein the variable control of the vehicle is performed based on the variable control level.

17. The vehicle control system of claim 10,
wherein the processor is further configured to determine whether variable control of the vehicle is activated and determine, based on the variable control of the vehicle being activated, the preset operating region and the current driving region of the vehicle.

18. The vehicle control system of claim 13, wherein the driving status of the vehicle is obtained from at least one of an external camera, a light detection and ranging (lidar) sensor, a speed sensor, an accelerator pedal position sensor (APS), a brake pedal sensor (BPS), or a steering angle sensor, or a combination thereof.

* * * * *